United States Patent
Qiang (10) Patent No.: US 9,794,352 B2
(45) Date of Patent: Oct. 17, 2017

(54) NETWORK FUNCTION VIRTUALIZATION SERVICE CHAINING

(71) Applicants: TELEFONAKTIEBOLAGET L M ERICSSON (PUBL), Stockholm (SE); Zu Qiang, Kirkland, Québec (CA)

(72) Inventor: Zu Qiang, Kirkland (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 226 days.

(21) Appl. No.: 14/405,743

(22) PCT Filed: Nov. 4, 2014

(86) PCT No.: PCT/IB2014/065802
§ 371 (c)(1),
(2) Date: Dec. 4, 2014

(87) PCT Pub. No.: WO2016/071736
PCT Pub. Date: May 12, 2016

(65) Prior Publication Data
US 2016/0277509 A1  Sep. 22, 2016

(51) Int. Cl.
*G06F 15/16* (2006.01)
*H04L 29/08* (2006.01)
*H04L 29/14* (2006.01)

(52) U.S. Cl.
CPC .......... *H04L 67/16* (2013.01); *H04L 67/1002* (2013.01); *H04L 67/101* (2013.01); *H04L 67/1031* (2013.01); *H04L 69/40* (2013.01)

(58) Field of Classification Search
CPC .............................. H04L 29/08; H04L 67/16
USPC .................................................. 709/201–247
See application file for complete search history.

(56) References Cited

U.S. PATENT DOCUMENTS

| | | | |
|---|---|---|---|
| 8,346,929 B1 * | 1/2013 | Lai | G06Q 10/10 709/226 |
| 9,167,501 B2 * | 10/2015 | Kempf | H04L 12/4633 |
| 9,614,739 B2 * | 4/2017 | Kumar | H04L 41/5041 |
| 2015/0124815 A1 | 5/2015 | Beliveau et al. | |
| 2015/0180730 A1 * | 6/2015 | Felstaine | H04L 41/022 709/225 |

(Continued)

OTHER PUBLICATIONS

Chiosi et al., Network Functions Virtualisation: An Introduction, Benefits, Enablers, Challenges & Call for Action, Oct. 22-24, 2012, pp. 1-16.*

(Continued)

*Primary Examiner* — Ario Etienne
*Assistant Examiner* — Thorne E Waugh
(74) *Attorney, Agent, or Firm* — Ericsson Canada Inc.; David J. Rahmer (57) ABSTRACT

Systems and methods for managing a service set in network function virtualization (NVF) are provided. A service set can be defined as an ordered list of services to be applied to packet traffic and assigned to instances of the services in a distributed pool of virtual hosts. Responsive to determining that a first service in the service set is to be transferred from a first host to a second host, other services in the service set can also be identified to be transferred to the second host to maintain quality of service and latency as a packet is processed by the service set.

18 Claims, 8 Drawing Sheets

(56) References Cited

U.S. PATENT DOCUMENTS

| | | | |
|---|---|---|---|
| 2015/0288541 A1* | 10/2015 | Fargano | H04L 41/0813 709/225 |
| 2015/0288767 A1* | 10/2015 | Fargano | H04L 41/0813 709/227 |
| 2015/0295849 A1* | 10/2015 | Xia | H04L 47/782 370/235 |
| 2016/0043952 A1* | 2/2016 | Zhang | H04L 67/16 709/223 |
| 2016/0050161 A1* | 2/2016 | Da | H04L 47/783 709/226 |

OTHER PUBLICATIONS

Zong, N., Problem Statement for Reliable Virtualized Network Function (VNF) Pool, Network Working Group, Internet-Draft, Jul. 15, 2013, pp. 1-11.*

Parker, R., Affirmed Networks, Service Service Function Chaining: Chain to Path Reduction, draft-parker-sfc-chain-to-path-00, Nov. 8, 2013, pp. 1-11.*

Anycast, copy taken from Internet on Dec. 4, 2014; 6 pages.

C. Filsfils et al.: "Segment Routing Architecture"; Jun. 6, 2014; 18 pages.

C. Filsfils et al.: "Segment Routing Use Cases"; Oct. 21, 2013; 36 pages.

Draft ETSI GS NFV-REL. 001, V0.2.3: "Network Function Virtualisation (NFV); Resiliency Requirements"; Sep. 2014 (retrieved on Oct. 28, 2014); 81 pages.

Yanlong, Zhai et al.: "SOA Middleware Support for Service Process Reconfiguration with End-to-End QoS Constraints"; 2009 IEEE International Conference on Web Services; Jul. 6, 2009; pp. 815-822.

Fdhila, Walid et al.: "Heuristics for composite Web service decentralization"; Aug. 14, 2012; pp. 599-619.

ETSI GS NFV 001, V1.1.1: "Network Functions Virtualisation (NFV); Use Cases"; Oct. 1, 2013; 50 pages.

International Search Report for PCT/IB2014/065802, dated Jul. 14, 2015; 4 pages.

* cited by examiner

NETWORK FUNCTION VIRTUALIZATION SERVICE CHAINING

TECHNICAL FIELD

This disclosure relates generally to systems and methods for network function virtualization.

BACKGROUND

Network Function Virtualization (NFV) is a network architecture concept that uses virtualization related technologies to virtualize network node functionalities into virtual building blocks that may be connected, or chained, together to create communication services. NFV aims to transform the traditional telecommunication operator networks by evolving standard Information Technology virtualization techniques to consolidate network equipment types onto industry standard high volume services, switches and storage, which could be located in a variety of points of presence including Data Centers, network nodes and in end user premises. It is also indicated that an important part of controlling the NFV environment should be done through automation network management and orchestration.

Network functions such as firewall, load balancer, WAN optimizer, etc. have conventionally been deployed as specialized hardware servers in both network operators' networks and data center networks, as the building blocks of the network services. With virtualization and NFV it is possible to move or extend the existing network function into a data center.

Numerous virtualization requirements have been discussed with respect to NFV including: portability, performance, elasticity, resiliency, security and service continuity. Performance and resiliency are considered important requirements when virtualizing telecom network functions such as Mobile Core Network functions. IMS functions, Mobile base station functions, Content Delivery Networks (CDN) functions, Home Environment functions, and Fixed Access Network functions. Migrating these telecom functions to a virtualized environment involves moving the control plane, data plane and service network into a cloud based network and using cloud based protocol to control the data plane. Service continuity, network security, service availability, resiliency in both control plane and data plane must be ensured at this migration.

High Availability (HA) can be achieved by eliminating any Single Points of Failure (SPOF) by creating a redundancy of resources. HA is ensured by the availability management functions at the platform, middleware, and application levels. Normally, HA is achieved with redundant infrastructure by including enough excess capacity in the design to accommodate a performance decline, that a group of network function instances providing the same functional works as a network function cluster, which provides failover and increased availability of applications, or parallel calculating power in case of high-performance computing clusters as in supercomputing.

There are several existing HA solutions, in which a cluster based High Availability solution is supported. A failover capability is achieved through redundancy across the multiple connected machines in the cluster, each with independent failure states. In the cloud environment, where the applications are running in virtualized execution environments (e.g. as a virtual machine), a hypervisor-based solution may also provide High Availability capability. Such solutions can provide continuous availability for applications in the event of server failures by creating a live shadow instance of a virtual machine that is always up-to-date with the primary VM. It monitors the hosts and VMs to detect any hardware and guest operating system failures. In the event of an outage, it can automatically trigger a failover to ensure zero downtime and prevent data loss. After the failover, a new virtual machine will be automatically created as the standby.

Today the usage of personal devices, e.g. smartphones and tablets, for internet service traffic, telecom specific service access, and accessing the corporate network, has increased significantly. At the same time, telecom operators are under pressure to accommodate the increased service traffic in a fine-grained manner. Services provided by telecom network must be done in an environment of increased security, compliance, and auditing requirements, along with traffic load may be changed dramatically overtime. Providing self-service provisioning in telecom cloud requires elastic scaling of the VNF based on the dynamic service traffic load and resource management e.g. computing, storage, and networking.

SUMMARY

It is an object of the present invention to obviate or mitigate at least one disadvantage of the prior art.

In a first aspect of the present invention, there is provided a method for managing a service set in a communication network. A service set is defined as an ordered list of services to be applied to packet traffic. Each service in the service set is assigned to an instance of the respective service at a first host. It is determined that a first service in the service set is to be transferred from an instance of the first service at the first host to an instance of the first service at a second host. A second service in the service set is identified, the second service being available in the second host. An instruction is sent to transfer the second service in the service set from an instance of the second service at the first host to an instance of the second service at the second host.

In some embodiments, of the first aspect, the first host and the second host are geographically-dispersed data centers.

In some embodiments, the second service can be identified in accordance with the second service being adjacent to the first service in the ordered list of services. The second service can be identified in accordance with minimizing the number of times the service set switches between the first host and the second host. The second service can be identified in accordance with a latency requirement associated with the first service and the second service.

In some embodiments, the method can include selecting a plurality of services in the service set to transfer from the first host to the second host, the plurality of services being sequential in the ordered list. The sequential plurality of services can include the first service.

In some embodiments, the first service in the service set can be transferred from the instance of the first service at the first host to the instance of the first service at a second host responsive to one of a failure of the instance of the first service at the first host, a switch-over of the instance of the first service at the first host, or a scaling of the instance of the first service at the first host.

In some embodiments, the method can include sending an instruction to an instance of a service directly preceding the first service in the ordered list to forward packet traffic to the instance of the first service at the second host.

In some embodiments, the method can include reassigning an IP address associated with the instance of the first service at the first host to the instance of the first service at a second host.

In another aspect of the present invention, there is provided a manager node comprising a processor and a memory, the memory containing instructions executable by the processor. The manager node is operative to define a service set as an ordered list of services to be applied to packet traffic. The manager node assigns each service in the service set to an instance of the respective service at a first host. The manager node determines that a first service in the service set is to be transferred from an instance of the first service at the first host to an instance of the first service at a second host. The manager node identifies a second service in the service set, the second service being available in the second host. The manager node sends an instruction to transfer the second service in the service set from an instance of the second service at the first host to an instance of the second service at the second host.

In another aspect of the present invention, there is provided a manager node comprising a definition module, an assignment module, a determination module, an identification module, and an instructing module. The definition module is configured for defining a service set as an ordered list of services to be applied to packet traffic. The assignment module is configured for assigning each service in the service set to an instance of the respective service at a first host. The determination module is configured for determining that a first service in the service set is to be transferred from an instance of the first service at the first host to an instance of the first service at a second host. The identification module is configured for identifying a second service in the service set, the second service being available in the second host. The instructing module is configured for sending an instruction to transfer the second service in the service set from an instance of the second service at the first host to an instance of the second service at the second host.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

As the demands on the telecom networks continue to rise, it has become apparent that existing telecom network functions may not be "cloud ready" yet. Most of the NFV functions are stateful and running on either specific hardware or a large virtual machine (VM). Many VMs are not designed to tolerate a system failure. The network functions can be very difficult in term of configuration, scale updating, etc.

Re-engineering may be needed for virtualization enabling, e.g. software adaption for software and hardware decoupling. For cloud-ready technologies, the telecom network functions may need to be re-designed as a stateless function with the ability to run on small VMs with multiple instances which can provide higher application availability. Dynamic scaling of the application can be achieved by adding more VMs into the system. Virtualization provides the elasticity ability to scale up/down, scale out/in with guaranteed computational resources, security isolation and API access for provisioning it all, without any of the overhead of managing physical servers. However, there are still many optimizations which can be used to avoid the increasingly overhead.

The following terminology will be used in describing embodiments of the present invention.

Network Function Consumer (NFC): A NFC is the consumer of virtual network functions. It can be either an individual user, home user or the enterprise user.

Network Function Virtualization (NFV): NFV technology uses the commodity servers to replace the dedicated hardware boxes for the network functions, for example, home gateway, enterprise access router, carrier grade NAT and etc. So as to improve the reusability, allow more vendors into the market, and reduce time to market. NFV architecture includes a NFV Control and Management Plane (orchestrator) to manage the virtual network functions and the infrastructure resources.

Network Function (NF): A functional building block within an operator's network infrastructure, which has well-defined external interfaces and a well-defined functional behavior. Note that the totality of all network functions constitutes the entire network and services infrastructure of an operator/service provider. In practical terms, a Network Function is today often a network node or physical appliance.

Network Function Provider (NFP): A NFP provides virtual network function software.

Network Service Provider (NSP): A company or organization that provides a network service on a commercial basis to third parties. A network service is a composition of network functions and defined by its functional and behavior specification. The NSP operates the NFV Control Plane.

Virtual Network Function (VNF): An implementation of an executable software program that constitutes the whole or a part of an NF that can be deployed on a virtualization infrastructure.

Virtual Machine (VM): A program and configuration of part of a host computer server. Note that the Virtual Machine inherits the properties of its host computer server, e.g. location, network interfaces.

NFV Infrastructure (NFVI): NFV Infrastructure indicates the computing, storage and network resources to implement the virtual network function. High performance acceleration platform is also part of it. NFVI is the totality of all hardware and software components which build up the environment in which VNFs are deployed. The NFVI can span across several locations. The network providing connectivity between these locations is also regarded to be part of the NFVI.

NFV Control and Management Plane (NFVCMP): A NFV Control and Management Plane is operated by a NSP and orchestrates the NFV-NFV Overview.

Network Function Virtualization Infrastructure as a Service (NFVIaaS). Virtual Network Function as a Service (VNFaaS) and Virtual Network Platform as a Service (VN-PaaS) are the NFV use cases which describe how telecom operators would like to build up their telecom cloud infrastructure using virtualization.

NFVIaaS is a generic IaaS plus NaaS requirement which allows the telecom operator to build up a VNF cloud on top of their own Data Center Infrastructure and any external Data Center Infrastructure. This will allow a telecom operator to migrate some of its network functions into a third party Data Center when it is needed. Furthermore, a larger telecom operator may have multiple Data Centers in different geographic locations. The operator may want to setup multiple virtual Data Centers (vDC), where each vDC can cross several of its physical Data Center geographic locations. Each vDC can be defined for providing one specific function, e.g. Telco Cloud.

VNFaaS is more focusing on enterprise network which may have its own cloud infrastructure with some specific services/applications running. VNFaaS allows the enterprise to merge and/or extend its specific services/applications into a third party commercial Data Center provided by a telecom operator. With this VNFaaS, the enterprise does not need to manage and control the NFVI or the VNF. However, NFV performance and portability considerations will apply to deployments that strive to meet high performance and low latency considerations.

With VNPaaS, the mobile network traffic, including WiFi traffic, is routed based on the APN to a specific packet data service server over the mobile packet core network. Applications running at the packet data service server may be provided by the enterprise. It is possible to have an interface to route the traffic into an enterprise network. But the infrastructure hosting the application is fully under control of the operator. However, the enterprise has full administrative control of the application and can apply all configurations on its own, potentially via a vDC management interface supported by the hosting operator.

All the above use cases require solutions for an operator to share the infrastructure resources with third parties. Therefore cross domain orchestration with access control is needed. Besides, the infrastructure resource management needs to provide a mechanism to isolate the traffic, not only based on the traffic type, but also from different operators and enterprises.

As discussed above, a geographically distributed data center (or cluster can provide improved high available. This type of solution allows the configuration of multiple clusters spanning different geographically-dispersed locations. Two types of switchovers and/or failovers can be supported by this solution—local or stretch.

With local clustering, all cluster participant nodes are at the same facility or data center and can be physically coupled with the heartbeat link or similar mechanism. This configuration can provide application failover, but cannot sustain hosting during a downtime that affects the entire facility or data center. For example, if the data center is affected by a catastrophic event, the entire facility will be subjected to downtime and cannot provide guaranteed uptime. Still, local clustering is a preferred solution for applications that need to be failed-over immediately. Authentication domain servers and financial transaction Web servers are some examples of servers that can negatively affect the infrastructure if they have any failover delay.

Stretch clustering or geographically dispersed clustering mitigates some issues with local clustering. If a primary site goes down due to disaster, local clustering cannot be relied upon to achieve the required uptime of mission critical applications. If a network has clusters spanning different seismic zones, applications can be failed over to a secondary site that is unaffected by the primary site downtime. Stretch clustering writes data to both the primary storage system and the remote storage system. This extends the capabilities of a single failover cluster solution and guards against downtime.

Figure 1:
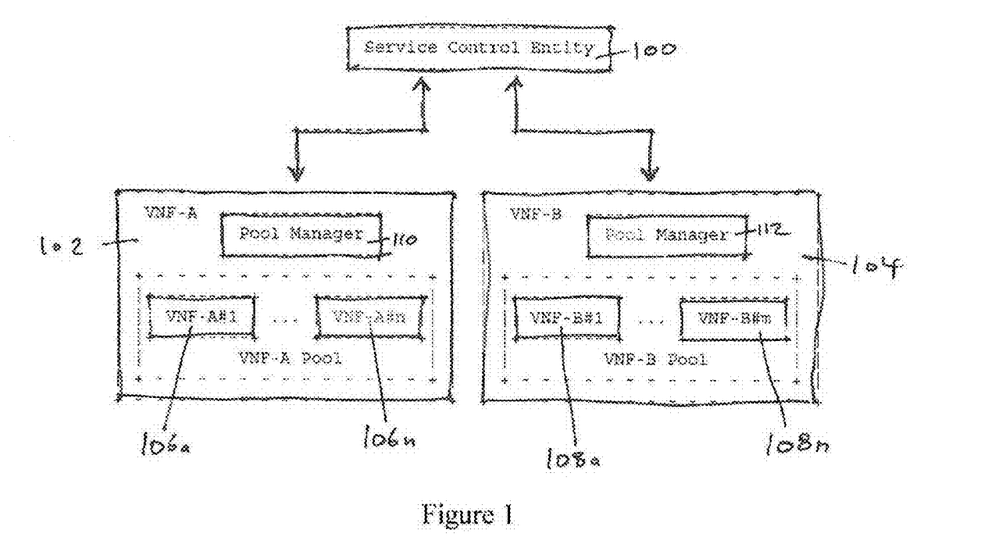
FIG. 1 illustrates an example VNF Pool architecture.

FIG. 1 illustrates an example VNF Pool architecture. Each VNF Pool 102 and 104 contains a number of VNF instances 106a-106n and 108a-108n and a Pool Manager 110/112. The Pool Manager 110/112 manages the VNF instances 106/108 within the respective Pool. Pool Managers 110 and 112 interact with the Service Control Entity 100 to provide the network function. Similar to Reliable Server Pooling (RSerPool) or Virtual Router Redundancy Protocol (VRRP), the Pool Manager 110/112 can provide either an identifier like "vFW", or a virtual address representing the VNF, to the Service Control Entity 100. The redundancy management will be managed within the scope of the pool and not visible to the Service Control Entity 100. Moreover, the reliability capability of each VNF 106/108 can be customized and provided to the Service Control Entity 100. The Service Control Entity 100 simply communicates with the Pool Manager 110/112 to request and orchestrate the network functions with desired reliability level.

As previously discussed, a virtual Data Center (vDC) network can be configured that includes multiple physical data centers at multiple geographic locations. Accordingly, the VNF Pool architecture can also be applied to such a "distributed" data center solution.

Figure 2:
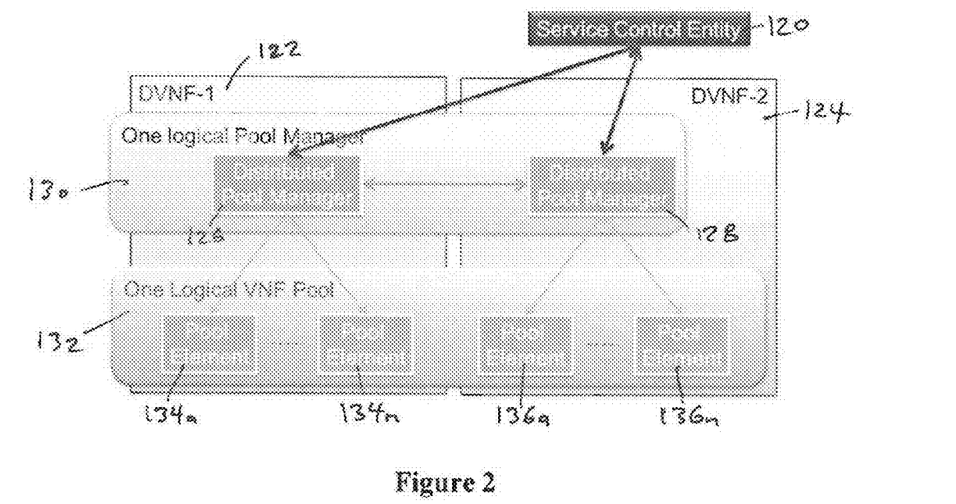
FIG. 2 illustrates an example Distributed VNF Pool architecture.

FIG. 2 illustrates an example Distributed VNF Pool Architecture. The Distributed VNF Pool can be thought of as one VNF Pool in practice, but it works with other physical VNF Pools to provide the same network function as one logical VNF Pool. In the example of FIG. 2, DVNF-1 122 and DVNF-2 124 are data centers which are geographically dispersed in two different locations. A Service Control Entity 120 is provided to determine how to combine the network functions to build network services. Each data center 122 and 124 will have its own Distributed. Pool Manager 126 and 128 which combine to form one logical pool manager function 130. The Distributed Pool Managers 126 and 128 shall work together to build up one logical VNF Pool 132 which is composed of Pool Elements 134a-134n located in DVNF-1 122 and Pool Elements 136a-136n located in DVNF-2 124. To the end user, this appears as one logical VNF Pool 132 and one logical Pool Manager 130.

Those skilled in the art will appreciate that, although only two distributed pools (or data centers) are shown in FIG. 2, in practice, it can be extended to any number of data center sites.

A Distributed Pool Manager 126 will manage the pool elements 134a-134n within its "local" pool and will hide its pool network topology from its peer distributed pool managers, such as Pool Manager 128. A peer distributed pool manager will have knowledge that there are alternative resources of the same VNF pool available in another location, e.g. another Data Center, but it does not need to know exactly how the resources are managed.

This can also allow for different HA solutions to be used in different pools, as far as the interactions between the distributed pool managers are standardized. Distributed Pool Managers can communicate information such as the pool states (e.g. the number of primary applications and the number of backup applications), resources states (e.g. pool capacity), data synchronization, and others.

Two types of data synchronization between the distributed pools can be considered: configuration data and live data. Configuration data refers to the application provisioning information which will allow an application to run properly. The configuration data synchronization can be done between the distributed pool managers, which will allow a failed application to be recovered by the distributed pool failover procedure without huge latency. Live data refers to the data generated at run-time of the application, e.g. the on-going session handling data. The live data synchronization can also be done between the distributed pool managers, which will allow a failed application to be recovered with the ongoing data at the distributed pool backup without huge latency. In some cases, live data synchronization can be optional if the recovery latency is acceptable. The Distributed Pool Managers can be configured to synchronize data with one another as required by their associated applications.

Two types of failover procedures can be considered with respect to the VNF Pools—a local failover and a distributed (or remote) failover. Local failover refers to a failover procedure where a backup resource located in the same pool will take the active role of a failed VNF instance. For example, referring again to FIG. 2, a "local" type of failover would be to failover from VNF 134a to VNF 134n as both VNFs reside on the same host (or data center site). Distributed pool failover refers to a failover procedure where a backup resource in the peer distributed pool will take the active role of the failed VNF instance. An example of a "distributed" type of failover would be to failover from VNF 134a to VNF 136a, as the VNFs are located on geographically dispersed hosts.

Upon recognizing a node failure, a Distributed VNF Pool Manager can make a decision based on the local pool resource states and the peer distributed pool states which type of failover should be performed. The selection of local vs remote failover can be based on a number of factors including capacity, bandwidth, performance, maintenance, etc. parameters. When a distributed pool failover procedure is chosen, the Distributed Pool Manager can send the latest state data of the failed application to the selected peer Distributed Pool Manager. The peer Distributed Pool Manager can then selects a resource and perform the recovery procedure. The selection procedure of the peer distributed pool can be further based on recovery policy and peer pool status information which is received at data synchronization.

In a more general sense, the switchover procedure also has two types—a local switchover and a distributed (or remote) switchover. It will be appreciated that "switchover" is a similar process to failover but can refer to a resource change that is made in response to any of a number of triggers, not only a failure. Local switchover refers to the procedure where a backup resource in the same local pool will take over the active role of a VNF instance. Distributed pool switchover refers to the procedure where a backup resource in a remotely-located pool will take the active role of a VNF instance. Based on a trigger (e.g. capacity overload, scaling. VM migration, etc.) a Distributed VNF Pool Manager can make a determination of which type of switchover will be performed. For a distributed pool switchover procedure, the Distributed Pool Manager will send the latest state data of the active application to the selected peer Distributed Pool Manager. The peer Distributed Pool Manager can then select a resource and perform the switchover procedure. The selection of a peer Distributed Pool Manager can be based on the local pool resource states and the peer distributed pool resource states as well as a recovery policy and any peer pool status information received at data synchronization.

For a large telecom operator, multiple vDCs may be created crossing multiple physical data centers. Each vDC can be defined for providing one specific function, e.g. Telco Cloud. As the infrastructure resources used by one vDC may be located in different geographic locations, the network performances may be different if a VM is placed at different hosts at different locations. VNF capacity may be limited if it is restricted that it can only be scaled (or moved) within one network zone (e.g. within one Data Center at a single geographic location). As a NFVI may be crossing multiple data centers and locations, it is possible to scale an elastic VNF crossing different network zones if it is needed. During cross-Data Center scaling, it can be made a mandatory requirement to provide the same level of Service Layer Agreement including performance, reliability and security.

A group of sequentially connected VNF instances, potentially deployed at different points in the network, can be used to provide a network service. This can be referred to as service chaining. A group of VNF instances is named as a VNF set. A VNF set can include single or multiple VNFs (e.g. virtual firewall, virtual load balancer, etc.), and each of those VNFs may have a number of instances. A VNF set can be used not only as part of a service chain, but also as multiple VNFs without any specific topological constraint.

In some networks, the services provided by the VNFs may need to process the user data packets with several selected VNF instances before delivering it to its destination. VNF set can extend beyond the conventional service chaining concept. It is a collocation of VNFs with unspecified network connectivity between them. When VNF works as VNF set, the service session is setup among a group of VNFs. For instance, when mobile users setup a PDN connection for IMS services, there are multiple network entities involved along the PDN connection, including eNB, Serving GW, PDN GW, P-CSCF, S-CSCF, etc. Another example is service function chaining, where a service chain is referring to one or more service processing functions in a specific order which are chained to provide a composite service. Each of these functions or services can be implemented by a VNF instance.

Returning to the Telco Cloud example, a service session may traverse multiple stateful and stateless VNF functions of a VNF set. With a distributed NFV Pool, a service session may also cross multiple Data Centers. When placing a VNF application on a host, one consideration is that it may be better from an availability perspective to "spread" the applications in a wide network zone. However, a wide network zone also increases the network latency which can be large. The dependencies between associated VNF applications can be considered when placing VNF into Data Centers. When scaling an application, VNFs cannot only be scaled with respect to compute and storage requirements. The VNF functions of a given service set may need to be grouped together, with auto-scaling techniques applied to the entire group, in order to satisfy performance requirements (e.g. latency between functions). The scaling policies, or ratio between the different VNFs, can be applied to the VNF set in aggregate to control the scaling process.

High availability solutions provide a cluster-like mechanism where a VNF can be failed-over to a standby node for disaster/data center failure recovery. To avoid the worst, case scenario, it is often preferred to host the backup VNF function in a different geographic location. This again requires cross-data center functionality for the VNF Pools.

Figure 3A:
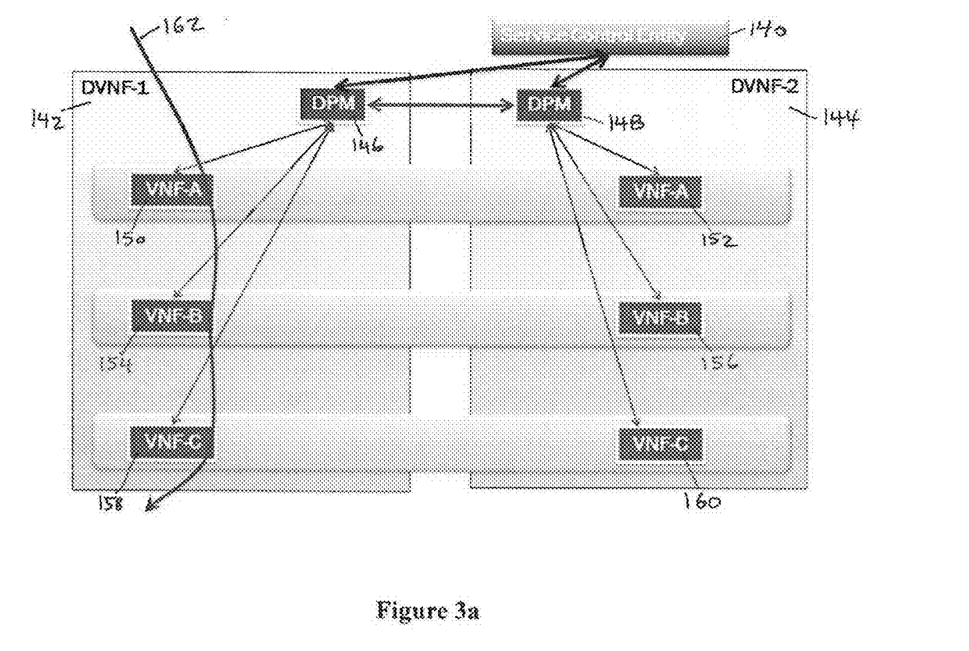
FIG. 3a-3c illustrate example service set data paths.
Figure 3B:
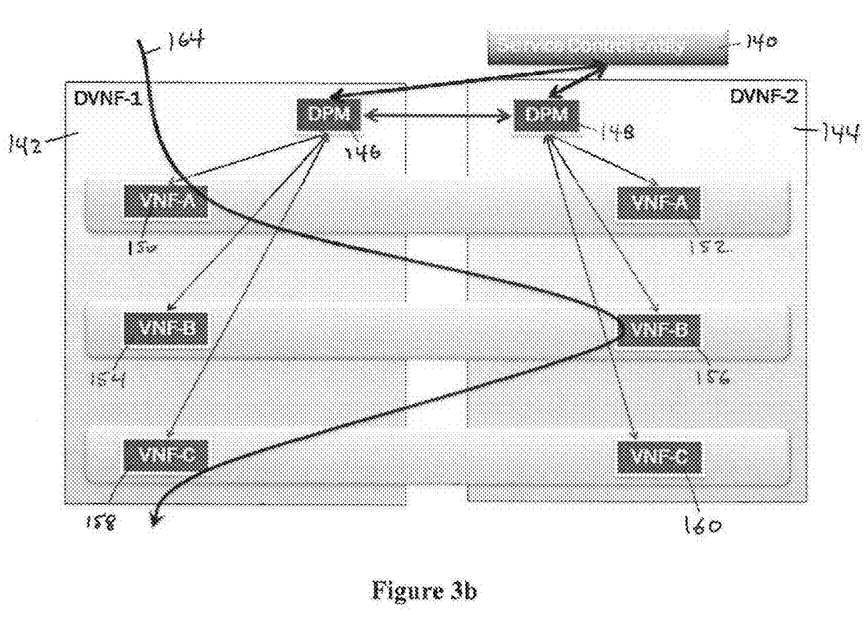
Figure 3C:
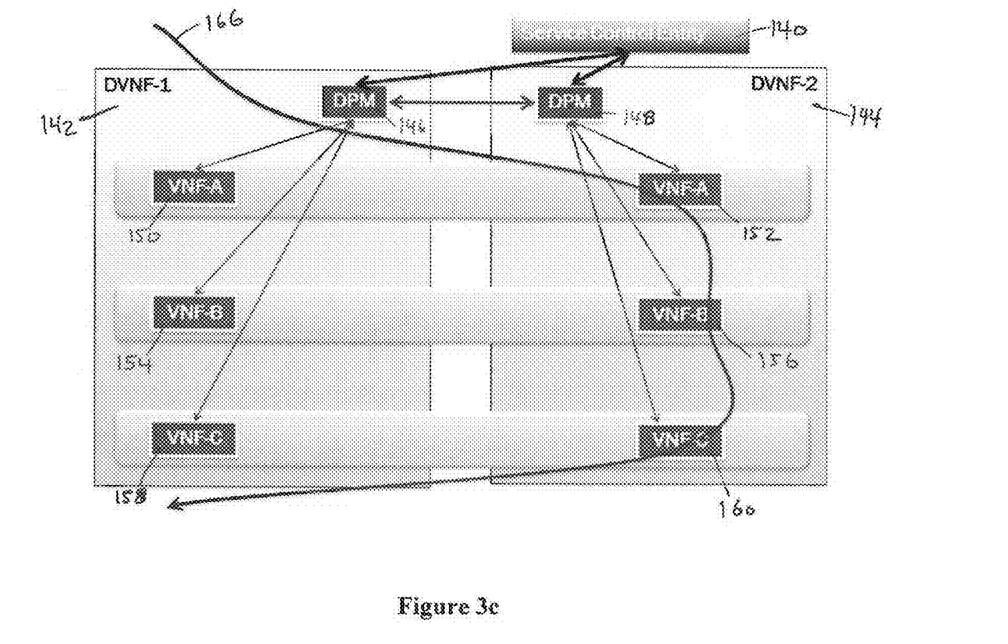

FIG. 3a-3c will be used to illustrate examples of potential performance issues when Distributed VNF Pooling is used. In this example, a service set composed of VNF functions VNF-A, VNF-B, VNF-C is used to handle packet traffic. The service set can be considered an ordered list of service functions that traffic must pass through between source and destination. This example does not explicitly illustrate the switching elements (physical or virtual) in the data center that can be involved with routing packets in a data center, but that aspect will be readily understood by those skilled in the art. The "data path" of this service set is from VNF-A to VNF-B to VNF-C.

In FIGS. 3a-3c, Service Control Entity (SCE) 140 is shown as a management entity of the vDC comprising a first data center DVNF-1 142 and a second data center DVNF-2 144. Distributed Pool Manager (DPM) 146 resides in DVNF-1 142 and DPM 148 resides in DVNF-2 144. The SCE 140, DPM 146 and DPM 148 can collectively be considered as the logical VNF manger function. VNF-A/B/C functions are located in three different Distributed VNF Pools each having instances of the function in both data centers. DVNF-1 142 hosts VNF-A 150, VNF-B 154 and VNF-C 158. DVNF-2 144 hosts VNF-A 152, VNF-B 156 and VNF-C 160.

Embodiments of the present invention include performance sensitive distribution VNF pool backup procedures by using the VNF set as defined by the SCE 140. At VNF Pool setup, the SCE 140 can define the VNF set as the ordered list of VNF services to be applied to traffic. The dependencies between the different VNF services within one VNF set are performance sensitive and may have criteria specifying the delay tolerance between adjacent services in the list, for example. At distributed switchover, the performance sensitivity can be considered by the SCE 140 and DPMs 146/148. In that way, the VNF data path performance can be guaranteed.

At DVNF Pool provisioning, the SCE 140 can inform the DPM 146/148 that a VNF is performance sensitive with a performance sensitive indicator. The SCE 140 can also select in which host (e.g. DVNF-1 142 or DVNF-2 144) the active VNF instance shall be started. In that way, all active VNF instances can be preferable placed in the same location if their performance sensitivity requires it. The SCE 140 will store the VNF set with its active instance location(s).

FIG. 3a illustrates an initial configuration of the VNF set. When all three VNF instances in the service set are located at a single host, DVNF-1 142, the data path 162 is shown as traversing VNF-A 150 VNF-B 154→VNF-B 154→VNF-C 158. Performance, such as latency between functions in the service set, can be guaranteed in such a case where the data path 162 never leaves DVNF-1 142.

However, at some point, the manager function may make the decision of triggering a distributed failover or switchover procedure. The result of the distributed switchover procedure is that one of the VNF instances in the data path will be switched from DVNF-1 142 to DVNF-2 144.

FIG. 3b illustrates the case where the active VNF-B function has been switched over from instance VNF-B 154 to instance VNF-B 156. The new data path 164 (VNF-A 150→VNF-B 156→VNF-C 158) now has to cross between data centers DVNF-1 142 and DVNF-2 144 twice. As Distributed VNF Pooling is typically designed for geographic distribution, this cross DVNF pool traffic can be a performance concern.

The distributed switchover/failover of FIG. 3b can be communicated from DPM 146 and/or DPM 148 to the SCE 140 to indicate that a backup resource in the peer distributed pool will now take the active role. Upon receiving the distributed switchover indication from the DPM 146/148, the SCE 140 can perform a look-up on the affected VNF set. If the SCE 140 determines that other VNF functions in the VNF set are also available in DVNF-2, it can send a notification to all DPMs which have active VNF instances in the VNF set. The notification can contain a switchover instruction and the target DVNF Pool ID (e.g. DVNF-2 144).

In this example, the SCE 140 can determine that DVNF-2 144 also hosts instances of the VNF-A and VNF-C functions (VNF-A 152 and VNF-C 160, respectively). As VNF-A and VNF-C are adjacent to VNF-B in the service set, the performance sensitivity parameters may require them to be co-located in the same geographic location. For this example it will be assumed that quality of service can be guaranteed when all functions of the VNF set are co-located.

The SCE 140 can send instructions to DPM 146 to migrate VNF-A and VNF-C functions to DVNF-2 144. After receiving the SCE 140 notification, the DPM 146 shall initiate a distributed switchover procedure with DPM 148 to switch over the active VNF instance to DVNF-2 144. Similar to as was described for VNF-B, the active VNF-A function is switched from VNF-A 150 to VNF-A 152. The active VNF-C function is switched from VNF-C 158 to VNF-C 160. Once the switchover is done, a conformation shall be send back to the SCE 140. The SCE 140 can update the stored VNF set with the new active instance location(s).

FIG. 3c illustrates the configuration after switchover, with the new data path 166 (VNF-A 152→VNF-B 156→VNF-C 160) traversing only VNFs in a single host, data center DVNF-2 144.

It should be noted that in the example network of FIGS. 3a-3c, instances of all of the VNF functions in the VNF set were available at all (both) hosts. In practice, with many geographic locations and a larger sized VNF set, each and every function of the VNF set may not exist at every location. In that case, the SCE can attempt to configure the data path to minimize the number of times it crosses from one data center to another. This can include placing adjacent, or sequential, VNF functions in the VNF in a common location. In some embodiments this configuration, or re-configuration process can be trigger by a failover, a switchover, a scaling, or a migration condition associated with at least one of the services in the VNF set. Then the manager can select at least one other function, adjacent to the VNF function in the set, to also move to the new data center location.

In some embodiments, the mechanisms described herein can be applied to overlay networks such as VXLAN and NVO3 (Network Virtualization Overlay using layer 3). Network overlay can add additional overhead when forwarding the data packets. Avoiding overlay connections may be one option which is more attractive for latency-sensitive applications.

Furthermore, additional network latency may be added when traversing cross-Data Center overlay connections. To avoid any additional network latency, all the functions of a VNF set may be required to be placed in the same low-latency network zone (e.g. at same host or same Data Center location). However, when the capacity limitation the selected network zone is reached, scaling-out one VNF into another network zone may be needed. In this case, as the service session has to traverse the same path, some Ping-Pong traffic between the network zones cannot be avoided. Depending on the network overlay technologies used for the cross network zone connection, the overhead network latency can be of various delays. In another words, the network performance may become unpredictable.

NFV resiliency is often a requirement for NFV networks, including both the control plane and data plane. Mechanisms can be provided to improve the service availability and fault management. With virtualization, the use of VNFs can pose additional challenges on the reliability of the provided services. For a VNF instance, it typically would not have built-in reliability mechanisms on its host (i.e. a general purpose server). Instead, there are more factors of risk such as software failure at various levels including hypervisors and virtual machines, hardware failure, and instance migration that may make a VNF instance unreliable. Even for cloud-ready NFV applications, a High Availability solution and a service restoration solution may still be needed.

One option to improve the VNF resiliency is to take a snapshot of the VM periodically, similar to data synchronization detailed above. At VNF failure, the network can restore the VM at the same or different host using the stored snapshot. However, there will be a downtime of the provided service due to the snapshot recovering. The downtime may be longer than the expected value which can be tolerated by NFV. NFV has a different level of reliability requirements, e.g. recovery times, as compared to enterprise cloud applications.

To improve the network function resiliency, a high availability solution may be needed for NFV network, which has the potential to minimize the service downtime at failure. VNF reliability can be achieved by eliminating any single points of failure by creating a redundancy of resources, normally, including enough excess capacity in the design to compensate for the performance decline and even failure of individual resources. That is, a group of VNF instances providing the same function works as a network function cluster or pool, which provides protection (e.g. failover) for the applications and therefore an increased availability.

Figure 4:
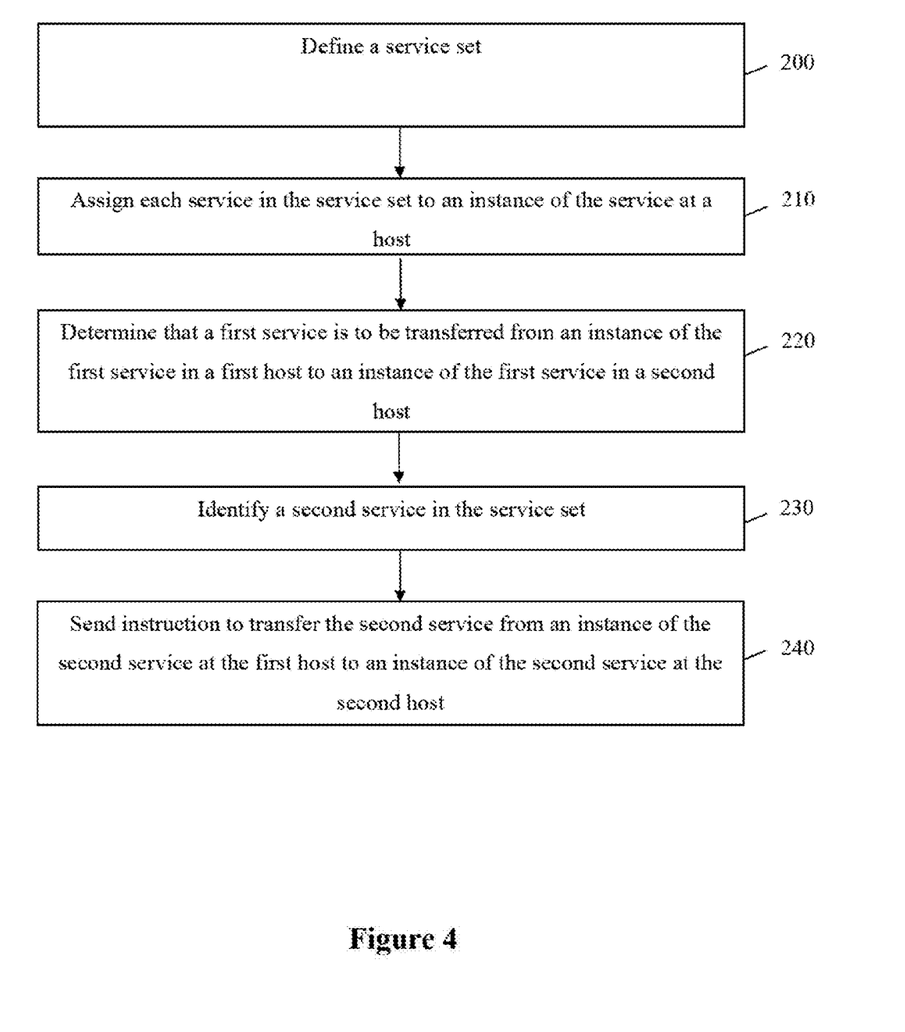
FIG. 4 is a flow chart illustrating a method according to embodiments of the present invention.

FIG. 4 is a flow chart illustrating a method according to embodiments of the present invention. The method can be implemented by a Service Control Entity or a manager node as have been described herein. The method begins by defining a service set (block 200). The service set is an ordered list of services that packet traffic is expected to traverse, with each service in the list providing a packet processing service. Each service in the service set is then assigned to an instance of the respective service at a host (block 210). In one embodiment, all of the services in the set can be assigned to instances that reside at a same host.

The manager determines that a first service is to be transferred, or switched over, from an instance of the first service at a first host to an instance of the first service at a second host (block 220). The determination of block 220 can made in response to receiving a message indicating a switchover procedure from a first host to a second host associated with the first service. The service set can be modified and updated by replacing the first service at a first host to an instance of the first service at a second host.

Responsive to determining that the first service is switching hosts, the manager identifies a second service in the service set, the second service currently being provided by an instance of the second service at the first and being available at the second host (block 230). The identification of block 230 is essentially identifying another service in the service set as a candidate to be switched from the first host to the second host. The availability of the second service at the second host can be determined by querying the second host for existence of an instance capable of providing the second service. The instance may have already been assigned a backup role for failover/switchover from the instance of the second service at the first host.

Optionally, the selection of the second service identified in block 230 can be made in accordance with its position in the service set. In some embodiments, the second service is adjacent to the first service in the ordered list. By adjacent, the second service can directly precede or directly follow the first service in the ordered list.

In other alternative embodiments, the second service can be selected in accordance with satisfying a condition to minimize the number of the hosts used in the service set. Further, a second service can be identified to minimizing the number of times the service set switches between the first host and the second host. This would in turn minimize the number of times a packet would cross a host boundary as it passes through the service set.

In another embodiment, the identification of the second service can be made in accordance with a latency requirement associated with the first and second services. The latency requirement can specify a maximum delay tolerance that is acceptable when routing a packet between the first service and the second service. The latency requirement may specify that the first and second services must be placed on hosts within the same data center.

The manager sends an instruction to transfer the second service from an instance of the second service at a first host to an instance of the second service at a second host (block 240).

Optionally, the method of FIG. 4 can repeatedly iterated until all services in the service set have been processed and determined if they can be moved to instances in the new host. The manager can be configured to minimize the number of cross-host instances that occur in the service set.

Optionally, a plurality of services in the service set can be selected to be transferred from the first host to the second host. The plurality of service can be a subset of the service set. The plurality of services can be sequential in the ordered list. Such a sequential plurality of services can include the first service.

Optionally, the determination of block 220 can be made responsive to the state or status of the first service. Examples of the state of the first service include a failure of the instance of the first service at the first host, a switch-over of the instance of the first service at the first host, and/or a scaling of the instance of the first service at the first host.

In some embodiments, the method of FIG. 4 can include sending an instruction to an instance of a service directly preceding the first service in the ordered list to forward packet traffic to the instance of the first service at the second host. Alternatively, the method can include sending an instruction to an instance of a service directly preceding the second service in the ordered list to forward packet traffic to the instance of the second service at the second host, if the second service precedes the first service in the ordered list.

In other optional embodiments, the method of FIG. 4 can include reassigning an IP address associated with the instance of the first service at the first host to the instance of the first service at a second host. Similarly, the IP address of the instance of the second service at the first host can be reassigned to the instance of the second service at the second host. In such a case, the instance at the first host can be taken out of service following the IP address reassignment procedure.

It will be appreciated by those skilled in the art that various service chaining mechanisms can be employed without departing from embodiments of the present invention.

In a first service chaining example, a packet is classified when it is received by an edge router of a data center and assigned a service set based on that classification. The packet can be encapsulated and tagged with the ordered list of services as a set of destinations. In this scenario, the manager node can instruct a service to modify the packet tag when a subsequent service has been moved to a new host. For example, in the embodiment of FIG. 3b, the SCE 140 can message DPM 146 to instruct VNF-A 150 to modify the tag of received packet to remove VNF-B 154 from the service set (e.g. next destination) and to add VNF-B 156 to the service set. Optionally, VNF-A 150 can be instructed to update its stored routing or forwarding table accordingly. The SCE 140 can then send instruction to switchover additional service(s) to the new host by communicating with the involved VNF instances and/or Distributed Pool Managers.

In a second service chaining example, an incoming packet may not be tagged with a full set of destinations on the service set. The header of the packet (e.g. the IP header) may be set with only the next service to be applied as its destination address. Subsequent destinations/services can be determined, and set, on a hop-by-hop basis. In this case, the manager node can inform the services (or the switching element associated with the service node) of the updated service chain routing.

Another optional embodiment involves the actual takeover of the IP address of a primary VNF by its backup VNF when a switchover occurs. In the example of FIG. 3b, DPM 146 and DPM 148 would coordinate the IP address takeover procedure. VNF-B 156 be assigned the IP address of VNF-B 154, and then VNF-B 154 would be taken out of service once the switch was complete. In this case there is no need to modify the header and/or tag of a packet traversing the service set. The original list of destination addresses continues to apply, even though the virtual services have changed hosts. Other types of addressing, virtual addressing, and network overlay techniques can also be applied to these examples.

Figure 5:
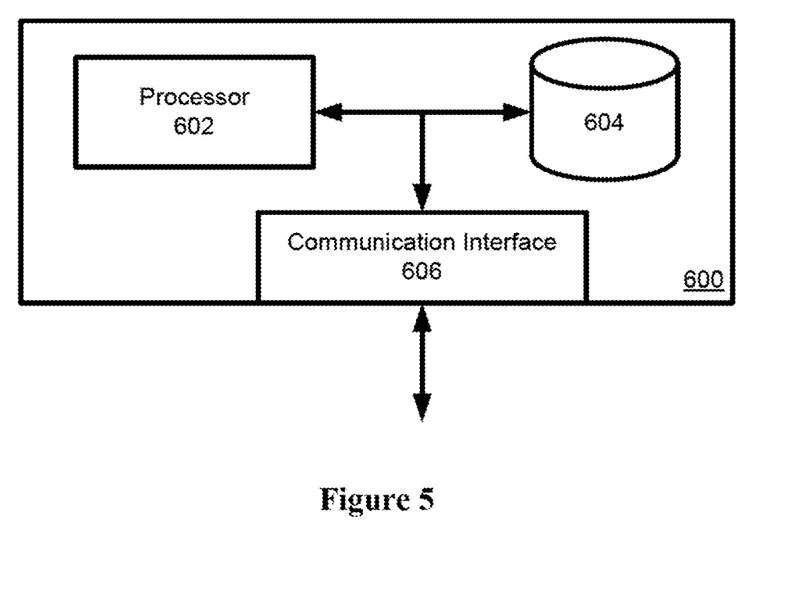
FIG. 5 is a block diagram of a network element.

FIG. 5 is a block diagram illustrating an example network element 600 which can be a manager node according to embodiments of the present invention. Manager node 600 can be any of the Service Control Entity, Distributed Pool Manager, or Virtual Network Function nodes, or a combination thereof, as have been described herein. The manager node 600 includes a processor 602, a memory or instruction repository 604 and a communication interface 606. The communication interface 606 can include at least one input port and at least one output port. The memory 604 contains instructions executable by the processor 602 whereby the network element 600 is operable to perform the various embodiments as described herein. In some embodiments, the manager node 600 can be a virtualized application hosted by the underlying physical hardware.

Manager node 600 is operative to define a service set as an ordered list of services to be applied to packet traffic; assign each service in the service set to an instance of the respective service at a first host; determine that a first service in the service set is to be transferred from an instance of the first service at the first host to an instance of the first service at a second host; identify a second service in the service set, the second service being available in the second host; and send an instruction to transfer the second service in the service set from an instance of the second service at the first host to an instance of the second service at the second host.

Figure 6:
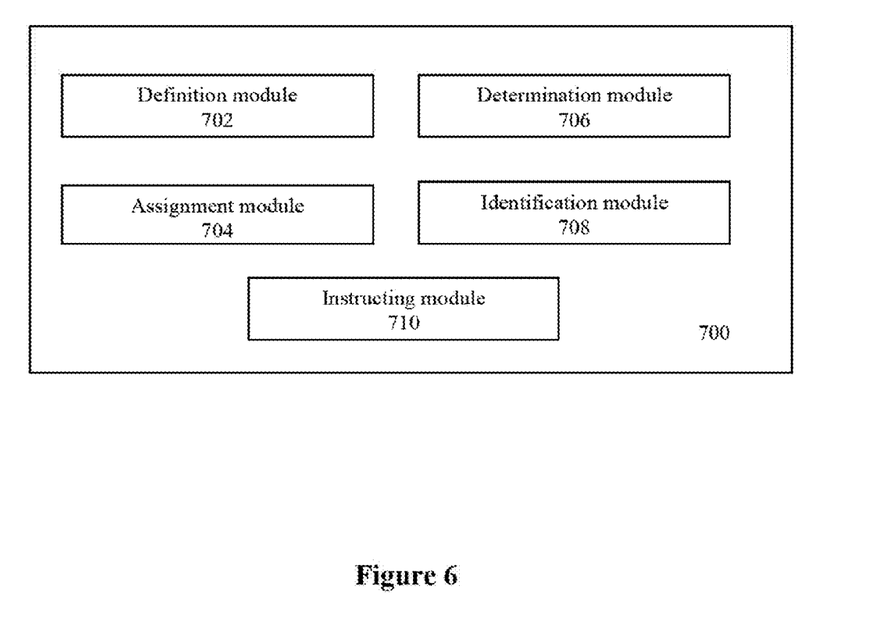
FIG. 6 is a block diagram of a manager node.

FIG. 6 is a block diagram of an example manager node 700 that can include a number of modules. The manager node 700 can include a definition module 702, an assignment module 704, a determination module 706, an identification module 708 and an instructing module 710. Definition module 702 is configured to define a service set as an ordered list of services to be applied to packet traffic. Assignment module 704 is configured to assign each service in the service set to an instance of the respective service at a first host. Determination module 706 is configured to determine that a first service in the service set is to be transferred from an instance of the first service at the first host to an instance of the first service at a second host. Identification module 708 is configured to identify a second service in the service set, the second service being available in the second host. Instructing module 710 is configured to send an instruction to transfer the second service in the service set from an instance of the second service at the first host to an instance of the second service at the second host.

Embodiments of the invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:
1. A method for managing a service set, comprising:
defining a service set as an ordered list of service functions to be applied to packet traffic;
assigning each service function in the service set to an instance of the respective service function at a first host location;
responsive to determining that a first service function in the service set is to be transferred from an instance of the first service function at the first host location to an instance of the first service function at a second host location,
identifying a second service function in the service set in accordance with the second service function being adjacent to the first service function in the ordered list of service functions and the second service function being available in the second host location; and sending an instruction to transfer the second service function in the service set from an instance of the second service function at the first host location to an instance of the second service function at the second host location.

2. The method of claim 1, wherein the first host location and the second host location are geographically-dispersed data centers.

3. The method of claim 1, wherein the second service function is identified in accordance with minimizing a number of times the service set switches between instances at the first host location and instances at the second host location.

4. The method of claim 1, wherein the second service function is identified in accordance with a latency requirement associated with the first service function and the second service function.

5. The method of claim 1, further comprising, selecting a plurality of service functions in the service set to transfer from the first host location to the second host location, the plurality of service functions being sequential in the ordered list.

6. The method of claim 5, wherein the sequential plurality of service functions includes the first service function.

7. The method of claim 1, wherein the first service function in the service set is to be transferred from the instance of the first service function at the first host location to the instance of the first service function at the second host location responsive to one of a failure of the instance of the first service function at the first host location, a switch-over of the instance of the first service function at the first host location, or a scaling of the instance of the first service function at the first host location.

8. The method of claim 1, further comprising, sending an instruction to an instance of a service directly preceding the first service function in the ordered list to forward packet traffic to the instance of the first service function at the second host location.

9. The method of claim 1, further comprising, reassigning an IP address associated with the instance of the first service function at the first host location to the instance of the first service function at a second host location.

10. A manager node comprising a processor and a memory, the memory containing instructions executable by the processor whereby the manager node is operative to:
define a service set as an ordered list of service functions to be applied to packet traffic;
assign each service function in the service set to an instance of the respective service function at a first host location;
responsive to determining that a first service function in the service set is to be transferred from an instance of the first service function at the first host location to an instance of the first service function at a second host location,
identify a second service function in the service set in accordance with the second service function being adjacent to the first service function in the ordered list of service functions and the second service function being available in the second host location; and
send an instruction to transfer the second service function in the service set from an instance of the second service function at the first host location to an instance of the second service function at the second host location.

11. The manager node of claim 10, wherein the first host location and the second host location are geographically-dispersed data centers.

12. The manager node of claim 10, wherein the second service function is identified in accordance with minimizing a number of times the service set switches between instances at the first host location and instances at the second host location.

13. The manager node of claim 10, wherein the second service function is identified in accordance with a latency requirement associated with the first service function and the second service function.

14. The manager node of claim 10, further comprising, selecting a plurality of service functions in the service set to transfer from the first host location to the second host location, the plurality of service functions being sequential in the ordered list.

15. The manager node of claim 14, wherein the sequential plurality of service functions includes the first service function.

16. The manager node of claim 10, wherein the first service function in the service set is to be transferred from the instance of the first service function at the first host location to the instance of the first service function at the second host location responsive to one of a failure of the instance of the first service function at the first host location, a switch-over of the instance of the first service function at the first host location, or a scaling of the instance of the first service function at the first host location.

17. The manager node of claim 10, further comprising, sending an instruction to an instance of a service directly preceding the first service function in the ordered list to forward packet traffic to the instance of the first service function at the second host location.

18. The manager node of claim 10, further comprising, reassigning an IP address associated with the instance of the first service function at the first host location to the instance of the first service function at a second host location.

* * * * *